April 17, 1973     G. W. G. McDONALD     3,728,239
CATALYST STRIPPING IN A BAFFLED VERTICAL VESSEL
Filed July 1, 1970

INVENTOR
GERALD W. G. MC DONALD

BY

ATTORNEY

United States Patent Office 3,728,239
Patented Apr. 17, 1973

3,728,239
CATALYST STRIPPING IN A BAFFLED VERTICAL VESSEL
Gerald W. G. McDonald, Summit, N.J., assignor to Commonwealth Oil Refining Company, Inc., New York, N.Y.
Filed July 1, 1970, Ser. No. 51,491
Int. Cl. B01j 11/02; C10g 13/14
U.S. Cl. 208—150
2 Claims

ABSTRACT OF THE DISCLOSURE

Improved gas-solid contact is achieved when treating finely divided solids with a gas in a vertical cylindrical vessel provided with a plurality of vertically-spaced, downwardly sloping baffles and with a substantially vertical impingement plate mounted directly above a downwardly sloping baffle. The apparatus is particularly suitable for stripping residual hydrocarbons from catalyst used in fluid catalytic cracking processes.

BACKGROUND OF THE INVENTION

In fluid catalytic cracking a charge stock is contacted with a fluidized catalyst under process conditions such that a substantial portion of the charge stock is transformed into desirable hydrocarbon products such as gasoline, olefin-rich light hydrocarbon streams, middle distillate blending stocks, and the like. The spent cracking catalyst is normally regenerated and returned to the fluidized bed reactor for further use. However, prior to regeneration it is desirable to remove or strip residual hydrocarbons from the spent catalyst. Normally stripping is carried out in a so-called stripper, which is an elongated vessel provided with side-to-side interior baffles. The spent catalyst is cascaded downwardly over the stripper baffles while steam flowing countercurrently to the descending catalyst contacts the same and removes volatilizable carbonaceous materials therefrom. However, where the catalyst is very finely divided, for example, having a particle size of less than about 100 microns, it is extremely difficult to disperse efficiently steam or any other stripping fluid throughout the descending catalyst mass. It is an object of the present invention to provide apparatus and method which obviates the foregoing difficulty and which provide improved gas-solid contact when finely divided solids are treated with a gas. Still other objects will readily present themselves to one skilled in the art upon reference to the ensuing specification, the drawings, and the claims.

SUMMARY OF THE INVENTION

The present invention contemplates an apparatus which comprises an elongated, vertically-disposed, substantially cylindrical vessel having a plurality of downwardly-sloping, vertically spaced baffles mounted therewithin, and a substantially vertical impingement plate or plates mounted directly above a downwardly sloping baffle so that a downwardly cascading solid particle mass impinges against the plate or plates.

The herein contemplated improved stripping method comprises alternately expanding and compacting a flowing spent catalyst mass within an atmosphere of a suitable stripping medium.

DESCRIPTION OF THE PREFERRED EMBODIMENTS

Figure 1:
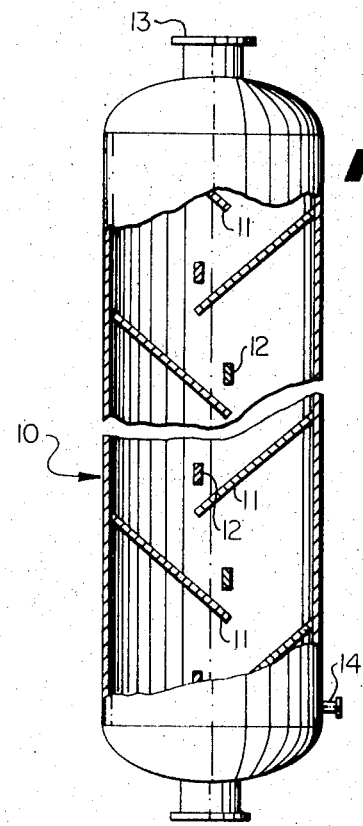
FIG. 1 is an elevational view, partly in section, of a vessel embodying the present invention.

Referring to FIG. 1, a vertical, elongated, substantially cylindrical vessel 10 is provided with downwardly-sloping baffles 11, which preferably overlap one another. Directly above a baffle 11 is situated an impingement plate 12 which can be mounted on the side of vessel 10 as shown or on baffle 11 itself as will be more fully discussed hereinbelow. Finely divided solids such as a spent catalyst, for example, enter the vessel through an appropriate inlet opening 13 and cascade downwardly on baffle 11 and at the same time impinging on impingement plates 12 which temporarily hold up and compact the impinging flowing mass and then disperse and expand the flowing mass over the sides thereof. An appropriate inlet 14 for a gaseous stripping medium such as a steam is provided at a lower portion of vessel 10 and the stripping medium introduced therethrough is dispersed within vessel 10 by means of an appropriate manifold and ascends upwardly through the cascading solid mass. The stripping medium together with the volatile hydrocarbons or the like removed from the solid mass can exit through opening 13, or an alternate outlet means therefor can be provided in the upper portion of vessel 10, if desired. Outlet means 15 situated at or near the bottom of vessel 10 is adapted for the removal of the treated solid mass.

Figure 2:
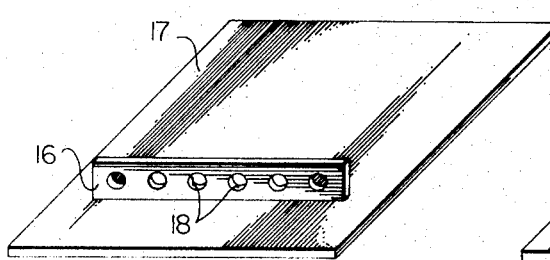
FIG. 2 is a perspective view of a baffle and a perforated impingement plate mounted thereon.

The configuration of the impingement plate can vary. As shown in FIG. 2, perforated plate 16 is mounted directly on baffle 17. Temporary retention and compaction of the flowing solid mass is readily achieved in this manner, yet a substantial buildup of solids behind plate 16 is avoided inasmuch as perforations 18 are sufficiently large to permit passage of the flowing solids therethrough. Perforations 18 can be straight-through openings or can be tapered, as desired.

Figure 3:
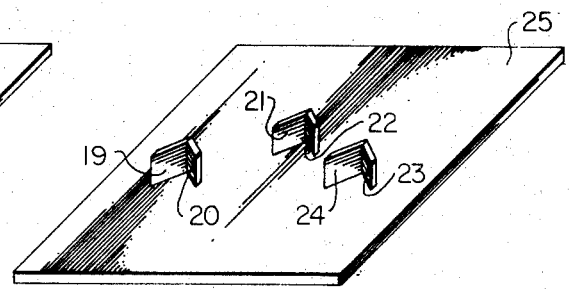
FIG. 3 is a perspective view of a baffle and a plurality of pairs of impingement plates mounted on the baffle and fixedly joined at an acute angle relative to each other.

A further embodiment of this invention is shown in FIG. 3 where pairs of impingement plates 19 and 20, 21 and 22, and 23 and 24 are mounted on baffle 25. The pairs of plates can be readily manufactured from segments of a suitable angle iron and welded on baffle 25 in a transversely spaced relationship or in any other configuration so as to generate the desired alternate compaction and expansion of the flowing solids mass.

Figure 4:
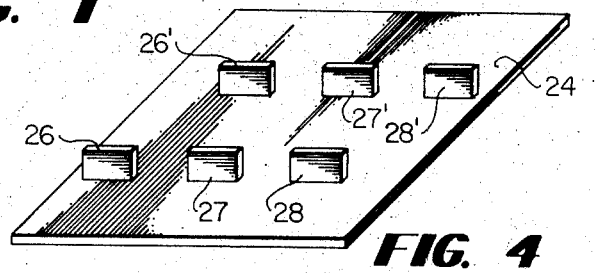
FIG. 4 is a perspective view of a baffle having a plurality of transversely-spaced impingement plates mounted thereon.
Figure 5:
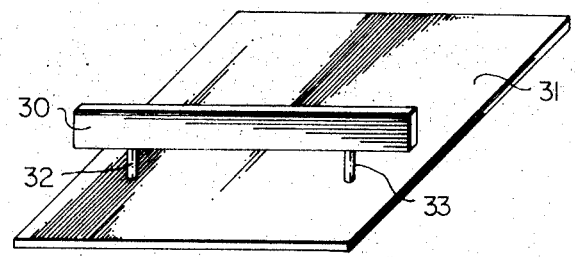
FIG. 5 is a perspective view of a baffle having a transversely extending impingement plate mounted above the baffle.
Figure 6:
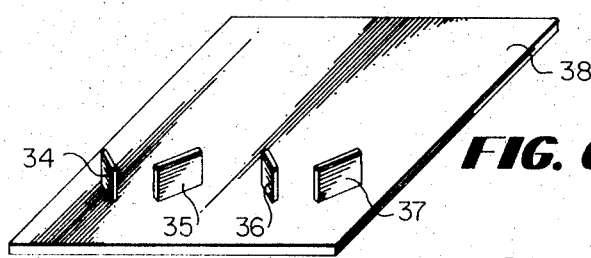
FIG. 6 is a perspective view of a baffle having a plurality of transversely spaced impingement plates mounted thereon at an acute angle relative to each other.

Similarly, FIG. 4 shows a series of spaced impingement plates 26, 27, and 28 and also 26', 27' and 28', extending transversely across baffle 29, FIG. 5 shows a single impingement plate 30 mounted above baffle 31 by means of suitable support such as rods 32 and 33, and FIG. 6 shows a series of plates 34, 35, 36 and 37 mounted on baffle 38 and at an acute angle relative to each other so as to alternately constrict and expand the solids mass flowing across baffle 38.

It has been found that in stripping a mass of spent fluid catalytic cracking catalyst the stripping efficiency is substantially improved if the catalyst mass is alternately compacted and expanded while surrounded by the striping medium. As a result, coke yields in catalytic cracking are considerably reduced. An additional benefit is gained in that the temperature in the regenerator during regeneration of the stripped catalyst is reduced.

While the present apparatus lends itself admirably to use in stripping of spent catalyst employed in hydrocarbon processing such as silica-alumina, platinum-alumina, molybdenum oxide-alumina, and the like, the present apparatus is equally well suited for other processes which require an intimate contact of comminuted or powdered solids with a reactive, a drying, or a scrubbing gas. Typical such applications are in treating metal oxides with hydracids, hydrogenation, smelting of sulfides, ore reduction, dehydration, drying of solids, and the like.

The foregoing discussion is intended as illustrative but not limiting. Still other variations and arrangements of parts within the spirit and scope of the present invention will readily present themselves to one skilled in the art.

What is claimed is:

1. A method for strippng spent fluid catalytic cracking catalyst which comprises flowing a solid catalyst mass over a plurality of downwardly sloping baffles and impinging said catalyst mass onto a substantially vertical plate situated directly above at least one of the downwardly sloping baffles and in the flow path of said catalyst mass, thereby alternately compacting and expanding said catalyst mass; said catalyst mass flowing downwardly against an ascending stream of a gaseous stripping medium.

2. The method in accordance with claim 1 wherein the stripping medium is steam.

References Cited

UNITED STATES PATENTS

| | | | |
|---|---|---|---|
| 3,330,046 | 7/1967 | Albertus | 34—10 |
| 2,541,801 | 2/1951 | Wilcox | 23—288 S |
| 2,463,434 | 3/1949 | Shankland | 23—1 F |
| 2,377,512 | 6/1945 | Page, Jr. | 208—161 |
| 3,123,547 | 3/1964 | Palmer et al. | 208—164 |
| 2,726,996 | 12/1955 | Bearer et al. | 23—288 G |
| 3,423,840 | 1/1969 | Beeken | 34—10 |
| 2,697,881 | 12/1954 | Kelley | 34—171 |
| 2,469,424 | 5/1949 | Wood et al. | 34—171 |

PATRICK P. GARVIN, Primary Examiner

P. E. KONOPKA, Assistant Examiner

U.S. Cl. X.R.

23—288 B, 288 G; 34—57 R, 171; 252—411, 420; 263—21 A; 266—20